US011422915B2

(12) United States Patent
Nagata

(10) Patent No.: US 11,422,915 B2
(45) Date of Patent: Aug. 23, 2022

(54) TRACE DATA ACQUISITION SYSTEM, TRACE DATA ACQUISITION METHOD, AND INFORMATION STORAGE MEDIUM

(71) Applicant: KABUSHIKI KAISHA YASKAWA DENKI, Kitakyushu (JP)

(72) Inventor: Takeshi Nagata, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 110 days.

(21) Appl. No.: 16/752,730

(22) Filed: Jan. 27, 2020

(65) Prior Publication Data
US 2020/0250069 A1 Aug. 6, 2020

(30) Foreign Application Priority Data

Jan. 31, 2019 (JP) .............................. JP2019-015794

(51) Int. Cl.
*G06F 11/00* (2006.01)
*G06F 11/34* (2006.01)
*G06F 11/30* (2006.01)
*G06F 11/32* (2006.01)

(52) U.S. Cl.
CPC ...... *G06F 11/3476* (2013.01); *G06F 11/3006* (2013.01); *G06F 11/3075* (2013.01); *G06F 11/326* (2013.01); *G06F 11/327* (2013.01); *G06F 11/3495* (2013.01)

(58) Field of Classification Search
None
See application file for complete search history.

(56) References Cited

U.S. PATENT DOCUMENTS

| | | | |
|---|---|---|---|
| 9,733,626 B2* | 8/2017 | Friman | G05B 23/0264 |
| 10,078,955 B1 | 9/2018 | Gang et al. | |
| 2005/0138471 A1* | 6/2005 | Okbay | G06F 11/3636 |
| | | | 714/25 |
| 2008/0114474 A1 | 5/2008 | Campbell et al. | |
| 2015/0201167 A1 | 7/2015 | Yamaji et al. | |
| 2016/0011922 A1* | 1/2016 | Torino | G06F 11/0766 |
| | | | 714/37 |
| 2016/0238659 A1 | 8/2016 | Shiromoto et al. | |
| 2016/0378096 A1 | 12/2016 | Nakama | |

(Continued)

FOREIGN PATENT DOCUMENTS

| | | |
|---|---|---|
| EP | 1 921 528 A2 | 5/2008 |
| JP | 2002-39531 A | 2/2002 |

(Continued)

OTHER PUBLICATIONS

Google Scholar/Patents—text refined (Year: 2021).*

(Continued)

*Primary Examiner* — Christopher S McCarthy
(74) *Attorney, Agent, or Firm* — Oblon, McClelland, Maier & Neustadt, L.L.P.

(57) ABSTRACT

A trace data acquisition system, comprising: a plurality of industrial machines configured to sequentially process an object; and circuitry configured to: determine whether one of the plurality of industrial machines has satisfied a specific condition; and request another industrial machine to acquire trace data when the one of the plurality of industrial machines is determined to have satisfied the specific condition.

19 Claims, 7 Drawing Sheets

(56) References Cited

U.S. PATENT DOCUMENTS

2018/0138090 A1* 5/2018 Go .................... G11C 16/0483
2018/0224827 A1   8/2018 Sugiyama et al.
2018/0316762 A1  11/2018 Matsumoto et al.

FOREIGN PATENT DOCUMENTS

| JP | 2006-31588 A    | 2/2006 |
| JP | 2011-69767 A    | 4/2011 |
| JP | 2018-128715 A   | 8/2018 |
| WO | WO 2015/068210 A1 | 4/2015 |

OTHER PUBLICATIONS

Google Scholar/Patents—search—text refined (Year: 2022).*
Japanese Office Action dated Aug. 18, 2020 in Patent Application No. 2019-015794 (with partial English translation), 3 pages.
Extended European Search Report dated May 6, 2020 in European Patent Application No. 20154673.6, 9 pages.
Japanese Office Action dated Dec. 15, 2020 in Japanese Patent Application No. 2019-015794 (with partial English language translation), 3 pages.

* cited by examiner

| CONTROLLER ID | TRACE CONDITION DATA | | |
|---|---|---|---|
| | AXIS | SIGNAL | SAMPLING CYCLE |
| 20A | 30A1-1 | TORQUE | 8.0 |
| | 30A1-2 | ENCODER | 16.0 |
| | ⋮ | ⋮ | ⋮ |
| 20B | 30B1-1 | TORQUE | 8.0 |
| | 30B2-1 | TEMPERATURE | 24.0 |
| | ⋮ | ⋮ | ⋮ |
| 20C | 30C1-1 | ENCODER | 16.0 |
| | 30C1-2 | TORQUE | 8.0 |
| | ⋮ | ⋮ | ⋮ |

FIG.4

| ALARM DATE AND TIME | ALARM CODE | CONTROLLER IN WHICH ALARM HAS BEEN GENERATED | CONTROLLER ID | TRACE DATA |
|---|---|---|---|---|
| 2018/12/26 10:02:42 | 015 | 20B | 20A | 20181226100242_20A.trs |
| | | | 20B | 20181226100242_20B.trs |
| | | | 20C | 20181226100242_20C.trs |
| 2018/12/27 15:41:05 | 142 | 20A | 20A | 20181227154105_20A.trs |
| | | | 20B | 20181227154105_20B.trs |
| | | | 20C | 20181227154105_20C.trs |
| ... | ... | ... | ... | ... |

| OBJECT ID | PROCESSING INFORMATION DB3 | | | |
|---|---|---|---|---|
| | START POINT | FINISH POINT | CONTROLLER | MOTOR CONTROL APPARATUS |
| w00001 | 2018/12/24 09:01:15 | 2018/12/24 09:01:42 | 20A<br>20B<br>20C | 30A1<br>30A2<br>. . . |
| w00002 | 2018/12/24 09:01:51 | 2018/12/24 09:02:20 | 20A<br>20B<br>20C | 30A1<br>30A2<br>. . . |
| . . . | . . . | . . . | . . . | . . . |

TRACE DATA ACQUISITION SYSTEM, TRACE DATA ACQUISITION METHOD, AND INFORMATION STORAGE MEDIUM

CROSS-REFERENCE TO RELATED APPLICATION

The present disclosure contains subject matter related to that disclosed in Japanese Patent Application JP2019-015794 filed in the Japan Patent Office on Jan. 31, 2019 the entire contents of which are hereby incorporated by reference.

BACKGROUND OF THE INVENTION

1. Field of the Invention

The embodiments disclosed herein relate to a trace data acquisition system, a trace data acquisition method, and an information storage medium.

2. Description of the Related Art

In WO 2015-068210A1, there is described a system configured to upload, when an alarm has been generated in an industrial machine, trace data on the industrial machine to a cloud server, to thereby provide the trace data to an analyst so that the analyst analyzes a cause of the generation of the alarm.

SUMMARY OF THE INVENTION

A trace data acquisition system according to one aspect of the present invention includes: a plurality of industrial machines configured to sequentially process an object; and circuitry configured to: determine whether one of the plurality of industrial machines has satisfied a specific condition; and request another industrial machine to acquire trace data when the one of the plurality of industrial machines is determined to have satisfied the specific condition.

BRIEF DESCRIPTION OF THE DRAWINGS

FIG. 3 is a table for showing a data storage example of a trace condition database.

FIG. 4 is a table for showing a data storage example of an alarm history database.

FIG. 7 is a table for showing a data storage example of a processing information database.

DESCRIPTION OF THE EMBODIMENTS

[1. Overall Configuration of Trace Data Acquisition System]

From a viewpoint of the inventor of the present invention, in a system including a plurality of industrial machines that sequentially process an object, each of the plurality of industrial machines may be influencing other industrial machines. When a certain industrial machine has satisfied a specific condition, another industrial machine may have caused the influence. In this case, the cause sometimes cannot be identified by referring to only trace data on the industrial machine that has satisfied the condition, and thus such a reference may not be sufficient for analyzing the state of the industrial machine. As a result of extensive research and development for acquiring data useful for analyzing the state of the industrial machine, the inventor of the present invention has conceived a novel and original trace data acquisition system and the like. A detailed description is now given of the trace data acquisition system and the like according to an embodiment of the present invention.

Figure 1:
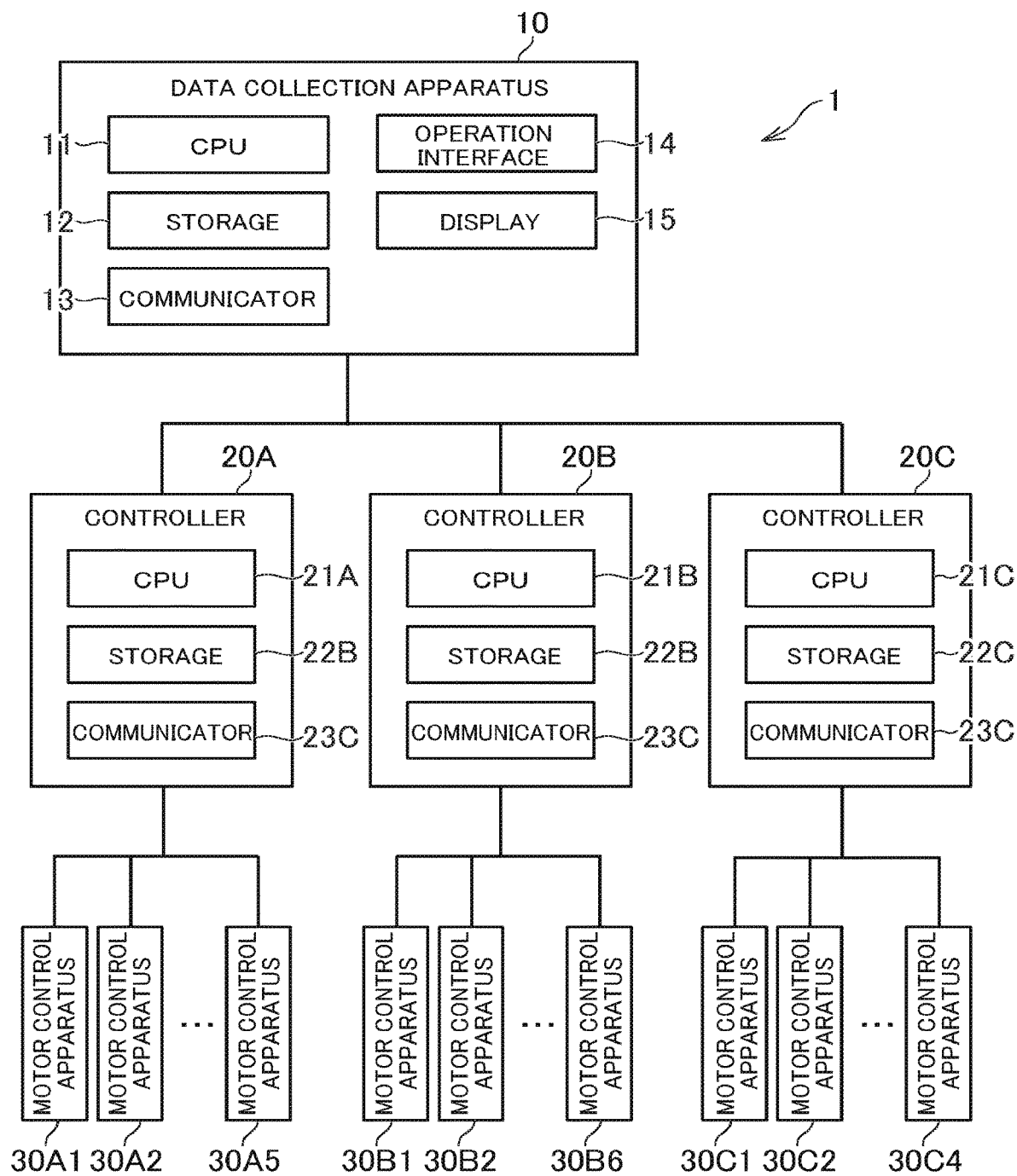
FIG. 1 is a diagram for illustrating an example of an overall configuration of a trace data acquisition system according to an embodiment of the present invention.

FIG. 1 is a diagram for illustrating an example of an overall configuration of the trace data acquisition system according to the embodiment. As illustrated in FIG. 1, the trace data acquisition system 1 includes a data collection apparatus 10, controllers 20A to 20C, and motor control apparatus 30A1 to 30A5, 30B1 to 30B6, and 30C1 to 30C4. When the controllers 20A to 20C are not required to be distinguished from one another, each of the controllers is hereinafter simply referred to as "controller 20". Similarly, when the motor control apparatus 30A1 to 30A5, 30B1 to 30B6, and 30C1 to 30C4 are not required to be distinguished from one another, each of the motor control apparatus is simply referred to as "motor control apparatus 30".

The data collection apparatus 10 is a computer configured to collect trace data. The trace data is data that indicates a state of a machine as time series data. In other words, the trace data is data obtained by quantifying a detection signal of a sensor as time series data. The trace data represents a log (history) of an operation, and thus is also referred to as "logging data". For example, in the trace data, internal information such as a torque signal, temperature information, and a feedback speed, position deviation, speed deviation, or current deviation of a motor is expressed as time series data.

Moreover, the trace data contains time point information (time stamp). The time point information is information relating to a collection time point or an acquisition time point of the trace data, and is associated with information such as a product serial number of a workpiece being produced, a controller ID for identifying each of the controllers 20, a process ID for identifying a certain work process, and an operator ID. "Process" is defined as a process grouped for one or a plurality of industrial machines. For example, the time point information indicates an acquisition start time point of the trace data, a time stamp of each event, an acquisition finish time point of the trace data, a transmission time point of the trace data, a reception time point of the trace data, and the like.

In this embodiment, the data collection apparatus 10 is an example of a host apparatus. The host apparatus is an apparatus configured to manage the plurality of controllers 20. The management herein refers to serving as a subject of collecting the trace data, and serving as a transmission destination to which the controllers 20 transmit the trace data. The host apparatus may be an apparatus other than the data collection apparatus 10. For example, a computer on which an engineering tool for setting the controllers 20 or the motor control apparatus 30, a server computer in a facility, for example, a plant, or a cloud server on the Internet may correspond to the host apparatus.

For example, the data collection apparatus 10 is a server computer, a personal computer, a cellular phone (including a smartphone), or a mobile terminal (including a tablet terminal). The data collection apparatus 10 includes a CPU 11, a storage 12, a communicator 13, an operation interface 14, and a display 15.

The CPU 11 includes at least one processor. The storage 12 includes a RAM, an EEPROM, and a hard disk, and is configured to store various programs and data. The CPU 11 is configured to execute various types of processing based on those programs and data. The communicator 13 includes a network card and a communication interface, for example, various types of communication connectors, and is configured to communicate to/from other devices. The operation interface 14 is an input device such as a mouse and a keyboard. The display 15 is a liquid crystal display, an organic EL display, or the like, and is configured to display various types of screens in accordance with an instruction from the CPU 11.

The controller 20 is an apparatus configured to control at least one motor control apparatus 30. In this embodiment, the controller 20 is an example of an industrial machine. The industrial machine herein refers to a machine configured to sequentially process an object. The object is an object to be processed, and is, for example, a component of a car, a motor cycle, and the like, an electric product, a material such as ceramics or resin, or a food. For example, the object moves on a transport apparatus, for example, a belt conveyer, and is processed in a predetermined order. The industrial machine may be an apparatus other than the controller 20. For example, the motor control apparatus 30 may correspond to the controller 20, or a robot controller, a machine tool, a PLC, or the like may correspond to the industrial machine.

For example, the controller 20 includes a CPU 21, a storage 22, and a communicator 23. The physical configuration of the CPU 21, the storage 22, and the communicator 23 is the same as that of the CPU 11, the storage 12, and the communicator 13. The communicator 23 may include an integrated circuit for a specific application, for example, motor control. Moreover, in FIG. 1, the respective components of the controllers 20A to 20C are denoted by reference numerals, which are each formed of an alphabet following a numerical value, such as the CPUs 21A, 21B, and 21C, the storages 22A, 22B, and 22C, and the communicators 23A, 23B, and 23C so that those components are distinguished from one another. When the components are not distinguished from one another, the alphabet suffix is omitted.

The motor control apparatus 30 is an apparatus configured to control at least one motor. The motor control apparatus 30 may also be referred to as a "servo amplifier" or a "servo-pack" (®). For example, the motor control apparatus 30 includes a CPU, a communication circuit, a DRAM, and an EEPROM, and controls a voltage for a motor based on a command received from the controller 20. The motor may be a rotary motor or a linear motor. For example, various sensors such as a motor encoder, a torque sensor, and a temperature sensor are connected to the motor control apparatus 30. The motor control apparatus 30 acquires a detection signal of each of the sensors, and transmits the detection signal to the controller 20 at any timing.

In this embodiment, it is assumed that a communication protocol developed for industrial machines is used in both of a network (a network on an upper level side) that connects the data collection apparatus 10 and the controllers 20 with each other and a network (a network on a lower level side) that connects the controllers 20 and the motor control apparatus 30 with each other, but various communication protocols can be applied as the communication protocol for those networks.

Moreover, in this embodiment, a description is given of a case in which the trace data acquisition system 1 includes the three controllers 20, but the trace data acquisition system 1 is only required to include a plurality of controllers 20, and the number thereof may be two or four or more. Moreover, the number of motor control apparatus 30 connected to the one controller 20 may be any number, and may be one. Moreover, in addition to the motor control apparatus 30, a sensor, for example, a temperature sensor, a camera configured to image a state of the processing, and the like may be connected to the controller 20.

Moreover, programs and data described as being stored in each of the data collection apparatus 10, the controllers 20, and the motor control apparatus 30 may be supplied through the network. Moreover, the hardware configurations of the data collection apparatus 10, the controllers 20, and the motor control apparatus 30 are not limited to the above-mentioned examples, and various types of hardware can be applied. For example, a reader (for example, optical disc drive or memory card slot) configured to read a computer-readable information storage medium and an input/output device (for example, USB terminal) configured to directly connect to an external device may be included. In this case, programs and data stored in the information storage medium may be supplied through the reader or the input/output device.

[2. Overview of Trace Data Acquisition System]

In the trace data acquisition system 1, an object is sequentially processed by each of the plurality of controllers transmitting commands to the motor control apparatus 30 connected to themselves, and the motor control apparatus 30 operating the motors based on the commands. In this embodiment, a description is given on the assumption that the object is processed by the controllers 20A, 20B, and 20C in this order.

For example, each of the controllers 20 receives a torque signal, temperature information, and the like from the motor control apparatus 30, to thereby determine whether or not an alarm has been generated. For example, the controller 20 determines that an alarm has been generated when a peak value of the torque signal becomes equal to or higher than a threshold value, or when the temperature information becomes equal to or higher than a threshold value. When an alarm has been generated in any one of the controllers 20, not only this controller 20 but also other controllers 20 stop operations. Then, when a worker or the like has solved a cause of the generation of the alarm, the operation of each of the controllers 20 is resumed.

There are a wide variety of causes of the generation of the alarm, and thus it is very important to acquire trace data effective for analyzing the cause. As in this embodiment, when the plurality of controllers 20 sequentially process the same object, the operations of the plurality of controllers 20 are closely related with one another, and a cause of an alarm generated in a certain controller 20 may exist in another controller 20. In this case, the cause of the alarm cannot be identified by acquiring trace data only on the controller 20 in which the alarm has been generated.

Therefore, in this embodiment, there is provided such a configuration that when an alarm has been generated in any one of the controllers 20, acquisition of trace data from all of the controllers 20 is requested through broadcast, and the trace data on all of the controllers 20 is acquired by the data collection apparatus 10. For example, when an alarm has been generated in the controller 20B, a cause thereof may exist in the controller 20A or 20C, and the data collection apparatus 10 acquires not only the trace data on the controller 20B, but also the trace data on the controllers 20A and 20C in which an alarm is not generated. As a result, it is possible to acquire data useful for analyzing the state of the controllers 20. A detailed description is now given of the trace data acquisition system 1.

[3. Functions to be Implemented in Trace Data Acquisition System]

Figure 2:
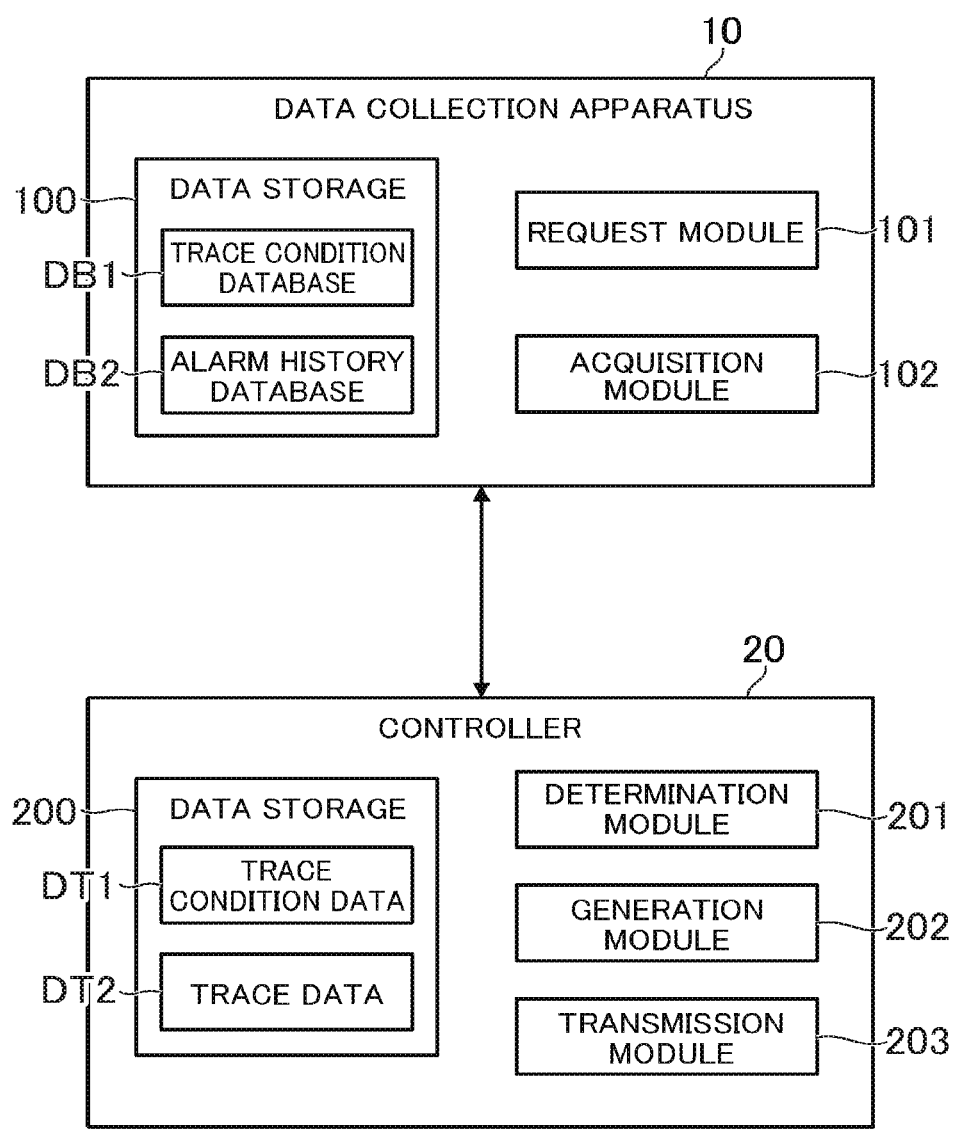
FIG. 2 is a functional block diagram for illustrating functions implemented in the trace data acquisition system.

FIG. 2 is a functional block diagram for illustrating functions to be implemented in the trace data acquisition system 1. The functions to be implemented by each of the data collection apparatus 10 and the controllers 20 are now described.

[3-1. Functions to be Implemented in Data Collection Apparatus]

As illustrated in FIG. 2, in the data collection apparatus 10, a data storage 100, a request module 101, and an acquisition module 102 are implemented. The data storage 100 is implemented mainly by the storage 12. The request module 101 and the acquisition module 102 are implemented mainly by the CPU 11.

[Data Storage]

The data storage 100 is configured to store data required to collect trace data DT2. For example, the data storage 100 stores a trace condition database DB1 and an alarm history database DB2.

FIG. 3 is a table for showing a data storage example of the trace condition database DB1. As shown in FIG. 3, the trace condition database DB1 is a database that stores trace condition data on each of the controllers 20, and stores a controller ID for uniquely identifying each of the controllers 20 and the trace condition data. As the information for uniquely identifying the controller 20, other information such as a name or an IP address of the controller may be used.

The trace condition is a measurement condition for generating the trace data DT2, and includes, for example, an axis to be traced, a type of a signal to be traced, a sampling cycle, a time zone for executing the trace, or the like. The trace condition data is data representing those trace conditions, and details of the trace condition data are set by, for example, a user who operates the data collection apparatus 10. For example, the trace condition data stored in the trace condition database DB1 is loaded to the controllers 20 at a timing of turning-on of a power supply, for example.

The trace condition data may be stored in each of the controllers 20 in advance, or may be loaded at any timing other than the turning-on of the power supply. Moreover, in this embodiment, a description is given of a case in which the trace condition data is prepared for each of the controllers 20, but a common trace condition may be set to the plurality of controllers 20. For example, a common trace condition may be set to all of the controllers 20, or a common trace condition may be set to a part of the controllers 20.

FIG. 4 is a table for showing a data storage example of the alarm history database DB2. As shown in FIG. 4, the alarm history database DB2 is a database in which the trace data DT2 collected when an alarm was generated is stored, and, for example, generation date and time of the alarm, an alarm code, the controller ID of a controller 20 in which the alarm has been generated, and the trace data DT2 are stored.

The generation date and time of the alarm is a point at which the alarm was generated or a point before or after this point, and may be a date and a time when the controller 20 has detected the alarm, or a date and a time when the data collection apparatus 10 receives an alarm generation notification. The alarm code indicates a type of the alarm that has been generated, and takes any one of values of a plurality of codes such as a torque abnormality and a temperature abnormality. It is assumed that a relationship between the alarm code and the details of the alarm is defined in advance in the data storage 100.

In this embodiment, when an alarm has been generated in any one of the controllers 20, the trace data DT2 on all of the controllers 20 existing on the same network is collected, and thus the trace data DT2 on all of the controllers 20 collected at the generation date and time of each alarm is stored in the alarm history database DB2. The information stored in the alarm history database DB2 is provided to the user at any timing. For example, pieces of the trace data DT2, which are associated with a certain alarm code, may be displayed so as to be compared with one another on a terminal of the user, or the trace data DT2, which is associated with an alarm that has been generated in a certain period, may be displayed on the terminal of the user.

The data to be stored in the data storage 100 is not limited to the above-mentioned example. For example, the data storage 100 may store machine information indicating configurations of the motor control apparatus 30, the sensors, and the like connected to the controller 20, or may store the name and IP address of each of the controllers 20. Moreover, for example, the data storage 100 may store information that identifies a process (order of processing object) of which the controller 20 is in charge. Moreover, for example, the data storage 100 may store a broadcast address in communication paths connecting the data collection apparatus 10 and the controllers 20.

[Request Module]

When a determination module described later determines that the controller 20 has satisfied a specific condition, the request module 101 requests the other controllers 20 to acquire the trace data DT2. The specific condition is only required to be a condition defined in advance, and is such a condition that the controller 20 is brought into a predetermined state or the controller 20 executes a predetermined operation. In other words, the specific condition is a condition indicating whether or not to collect the trace data DT2.

"The acquisition of the trace data DT2" in this case refers to causing the controller 20 to secure data that can be acquired. When the controller 20 uses a ring buffer so as to record data as in this embodiment, securing data by copying the data to another storage area, an external memory, or the like corresponds to the acquisition of the trace data DT2. When the controller 20 does not use a ring buffer, for example, not overwriting or not deleting the data corresponds to the acquisition of the trace data DT2. For example, when the controller 20 acquires the trace data DT2 after the request from the request module 101, the processing of storing the trace data DT2 in the data storage 200 of the controller 20 corresponds to the processing of acquiring the trace data DT2.

The request by the request module 101 serves as a trigger for causing the controller 20 to acquire the trace data DT2. The request may be made by transmitting information in a predetermined form. In this embodiment, the controller 20 does not always acquire the trace data DT2 immediately after the request is received. For example, the controller 20 acquires the trace data DT2 when a condition for acquiring the trace data DT2 is satisfied after the request is received. This condition may be any condition, and is such a condition that the torque signal exhibits a certain waveform, or a feedback speed of the motor is within a predetermined range, for example. When a synchronous communication is available between the data collection apparatus 10 and the controller 20, and the request by the request module 101 is transmitted through the synchronous communication (that is, the request is processed as a synchronous task), the controller 20 may acquire the trace data DT2 immediately after the request is received.

In this embodiment, a description is given of a case in which generation of an alarm corresponds to the satisfaction of the specific condition, but any condition can be applied as the specific condition. For example, the specific condition includes such a condition that a specific switch in the controller 20 turns on, this switch turns off, or a detection signal of a sensor exhibits a predetermined characteristic although a generation condition for an alarm is not satisfied (that is, processing of object is not stopped). The predetermined characteristic may be a characteristic specified by the user as a characteristic for which the trace data DT2 is required to be collected. The predetermined characteristic includes such a characteristic that a disturbance occurs to a waveform of the torque signal, a settling time becomes equal to or longer than a threshold value, and a peak value or a convergence value of the torque signal exceeds an allowable range.

When it is determined that an alarm has been generated in the controller 20, the request module 101 requests other controllers 20 to acquire the trace data DT2. The other controllers 20 are controllers 20 in which the alarm has not been generated. The request module 101 may request at least one of the other controllers 20 to acquire the trace data DT2.

In this embodiment, a description is given of a case in which the request module 101 requests all of the controllers 20 existing on the same network to acquire the trace data DT2 when an alarm has been generated in a certain controller 20. That is, the request module 101 requests each of the controller 20 in which the alarm has been generated and the other controllers 20 to acquire the trace data DT2. When the controller 20 in which the alarm has been generated voluntarily transmits the trace data DT2, the request module 101 is not required to request the controller 20 in which the alarm has been generated to acquire the trace data DT2, and thus may not request the acquisition of the trace data DT2. Moreover, as in a modification example of the present invention described later, the request module 101 may request not all of the other controllers 20, but a part of the other controllers 20 to acquire the trace data DT2.

For example, the request module 101 transmits a packet containing an identifier indicating the request for the acquisition of the trace data DT2 to all of the controllers 20, to thereby request the acquisition of the trace data DT2. The request module 101 may transmit this packet to the broadcast address, or may transmit this packet to the IP addresses of the individual controllers 20.

In this embodiment, the three controllers 20A to 20C belong to the same group, and a common object is processed, but a plurality of groups may exist in a facility, for example, a plant. This group is also referred to as a "line" or "cell". In this case, a network may be divided into parts corresponding to respective groups, so that the trace data DT2 may be collected for each of the groups. When an alarm has been generated in a certain group, the request module 101 may request other groups to acquire the trace data DT2, but a different group has a distant relationship with the alarm. Therefore, in this embodiment, it is assumed that the other groups are not requested to acquire the trace data DT2. That is, when it is determined that an alarm has been generated in a controller 20 in a certain group, the acquisition module 101 requests all of controllers 20 in this group to acquire the trace data DT2, and does not request the other groups to acquire the trace data DT2.

Moreover, the request module 101 may request the controller 20 to acquire the trace data DT2 when an alarm is not generated. For example, when the user of the data collection apparatus 10 executes a predetermined operation, or a predetermined condition is satisfied in an application executed by the data collection apparatus 10, the request module 101 may request the controller 20 to acquire the trace data DT2.

[Acquisition Module]

The acquisition module 102 acquires the trace data DT2 on the controller 20, which has satisfied the specific condition, and the trace data DT2 on the other controllers 20. In this embodiment, the generation of the alarm corresponds to the satisfaction of the specific condition, and the acquisition module 102 acquires the trace data DT2 on the controller 20 in which the alarm has been generated, and the trace data DT2 on the other controllers 20. Moreover, in this embodiment, the request module 101 requests all of the controllers 20 to acquire the trace data DT2, and thus the acquisition module 102 acquires the trace data DT2 transmitted by each of the controllers 20 in response to the request by the request module 101.

When the controller 20 in which an alarm has been generated voluntarily transmits the trace data DT2, the acquisition module 102 acquires the voluntarily transmitted trace data DT2. Moreover, when the acquisition of the trace data DT2 is requested through an operation by the user or processing by an application executed by the data collection apparatus 10, the acquisition module 102 acquires the trace data DT2 transmitted in response to this request. Further, in the case in which the trace data DT2 is transmitted when a predetermined trigger condition is satisfied in the controller 20, the acquisition module 102 acquires the trace data DT2 transmitted in response to the satisfaction of the trigger condition.

In this embodiment, the acquisition module 102 records, in the storage, the acquired trace data DT2 in association with alarm information on the alarm that has been generated. The alarm information may be any information relating to the alarm, and is, for example, a generation date and time, an alarm code, or a controller ID of the controller 20 in which the alarm has been generated. Setting information such as parameters of the controller 20 or the motor control apparatus 30 at the time of generation of the alarm may be contained in the alarm information.

Moreover, in this embodiment, the acquisition of the trace data DT2 is requested not only from the controller 20 in which the alarm has been generated, but also from all of the other controllers 20, and thus the acquisition module 102 acquires the trace data DT2 on all of the plurality of controllers 20. Therefore, the trace data DT2 on all of the controllers 20 is stored in the alarm history data for one alarm. As described above, all of the controllers 20 mean all of the controllers 20 existing on the same network including the controller 20 in which the alarm has been generated and the other controllers 20, and do not contain the controllers 20 on other networks.

In this embodiment, each of the plurality of controllers 20 controls at least one motor control apparatus 30, and thus the acquisition module 102 acquires trace data DT2 on the motor control apparatus 30 controlled by the controller 20 in which the alarm has been generated and trace data DT2 on the motor control apparatus 30 controlled by the other controllers 20. With the configuration example of FIG. 1, the acquisition module 102 acquires the trace data DT2 on all of the motor control apparatus 30A1 to 30A5, 30B1 to 30B6, and 30C1 to 30C4. When an axis is not specified as an axis to be traced in the trace condition data, the axis is excluded from a target for acquisition of the trace data DT2.

The acquisition module 102 may acquire the trace data DT2 at any timing. The timing may be a timing at which a communication traffic of the network is relatively small and there is room for additional communication, or a timing that is convenient for at least any one of the data collection apparatus 10 and the controller 20. The convenient timing is, for example, a timing at which a processing load is relatively small and a timing at which an important synchronous task is not being processed. Moreover, for example, the trace data DT2 may be stored in the controller 20, and when the user executes an operation of analyzing the trace data DT2, the acquisition module 102 may acquire the trace data DT2, or the acquisition module 102 may acquire the trace data DT2 when a collection time point determined in advance is reached.

[3-2. Functions to be Implemented in Controller]

As illustrated in FIG. 2, in the controller 20, a data storage 200, a determination module 201, a generation module 202, and a transmission module 203 are implemented. In this embodiment, all of the controllers 20 have the same functions, and thus, in FIG. 2, only one of the controllers 20 is illustrated for the sake of simplicity. The data storage 200 is implemented mainly by the storage 22. The determination module 201, the generation module 202, and the transmission module 203 are implemented mainly by the CPU 21.

[Data Storage]

The data storage 200 is configured to store data required to transmit the trace data DT2 to the data collection apparatus 10. For example, the data storage 200 is configured to store trace condition data DT1. In this embodiment, the trace condition data DT1 is loaded when a power supply for the controller 20 is turned on, and the data storage 200 stores the loaded trace condition data DT1.

Moreover, for example, the data storage 200 stores the trace data DT2 generated based on the trace condition data DT1. The trace data DT2 may be stored in any storage area of the data storage 200. In this embodiment, a description is given of the case in which the trace data DT2 is stored in the storage area referred to as a so-called ring buffer. For example, the ring buffer stores measurement results in the most recent period, and measurement results before this period is deleted. A period during which the measurement results remains in the storage data DT2 is determined in accordance with a memory size of the ring buffer.

The data stored in the data storage 200 is not limited to the above-mentioned example. For example, the data storage 200 may store machine information indicating configurations of the motor control apparatus 30, sensors, and the like connected to the controllers 20, a name and IP address of each of the motor control apparatus 30, parameters of the motor control apparatus 30, and the like. Moreover, for example, the data storage 200 may store the IP address of the data collection apparatus 10 and the broadcast address in the communication paths connecting the data collection apparatus 10 and the controllers 20.

[Determination Module]

A determination module 201 is configured to determine whether or not the controller 20 has satisfied the specific condition. In this embodiment, the determination module 201 is implemented by each of the plurality of controllers 20, and thus each of the determination modules 201 of the plurality of controllers 20 determines whether or not the own controller 20 has satisfied the specific condition.

The determination module 201 determines whether or not the specific condition is satisfied based on detection signals of sensors and switches acquired by the controller 20 and the like. For example, the determination module 201 determines whether or not the specific condition is satisfied based on the detection signal of the motor encoder, the torque sensor, or the like connected to the motor control apparatus 30. Moreover, for example, the determination module 201 determines whether or not the specific condition is satisfied based on the detection signal of the temperature sensor connected to the controller 20. Moreover, for example, the determination module 201 determines whether or not the specific condition is satisfied based on a detection signal indicating on/off of a switch inside the controller 20.

In this embodiment, the generation of the alarm in the controller 20 corresponds to the satisfaction of the specific condition, and the determination module 201 determines whether or not the controller 20 has satisfied a generation condition of the alarm. For example, the generation condition of the alarm is defined for each of the alarm codes, and thus the determination module 201 determines whether or not a value indicated by a detection signal of a sensor acquired by the controller 20 has satisfied the generation condition. The determination module 201 generates the alarm of the alarm code for which the generation condition has been satisfied, and transmits, for example, a generation date and time of the alarm and the alarm code of the generated alarm to the data collection apparatus 10.

[Generation Module]

The generation module 202 is configured to generate the trace data DT2 based on the trace condition data DT1. For example, the generation module 202 is configured to generate the trace data DT2 containing measurement results measured based on the trace condition data DT1. In this embodiment, pieces of information such as an axis to be traced, a type of signal to be traced, a sampling cycle, or a time zone in which the trace is executed is indicated in the trace condition data DT1, and the generation module 202 generates the trace data DT2 based on those pieces of information. When the time point information is to be contained in the trace data DT2 as in this embodiment, the generation module 202 may acquire a date and time through a real time clock, and contain the date and time in the trace data DT2.

In this embodiment, the trace data DT2 is stored in the ring buffer, and the generation module 202 records the measurement results in the most recent period in the data storage 200, and deletes the measurement before this period from the data storage 200. Then, when the generation module 202 receives a request from the request module 101, the generation module 202 generates the trace data DT2 based on the measurement results recorded in the data storage 200. That is, the generation module 202 captures the trace data DT2 at a point at which the request from the request module 101 is received, and acquires the trace data DT2 as trace data DT2 to be transmitted.

When the controller 20 in which the alarm has been generated voluntarily transmits the trace data DT2, the generation module 202 may capture the trace data DT2 at a point at which the alarm was generated, and acquire the trace data DT2 as the trace data DT2 to be transmitted. Moreover, when the trace data DT2 is transmitted at a timing other than the generation of the alarm, the generation module 202 may capture the trace data DT2 at this timing, and acquire the trace data DT2 as the trace data DT2 to be transmitted.

[Transmission Module]

The transmission module 203 transmits the own trace data DT2 to the data collection apparatus 10. In this embodiment, when the request module 101 of the data collection apparatus 10 requests the acquisition of the trace data DT2, the transmission module 203 transmits the trace data DT2 generated by the generation module 202. When the controller 20 in which an alarm has been generated voluntarily transmits the trace data DT2, the transmission module 203 transmits the trace data DT2 generated by the generation module 202 when an alarm is generated. Moreover, when the trace data DT2 is transmitted at a timing other than the generation of the alarm, the transmission module 203 transmits the trace data DT2 generated by the generation module 202 when this timing is reached.

[4. Processing to be Executed in Trace Data Acquisition System]

Figure 5:
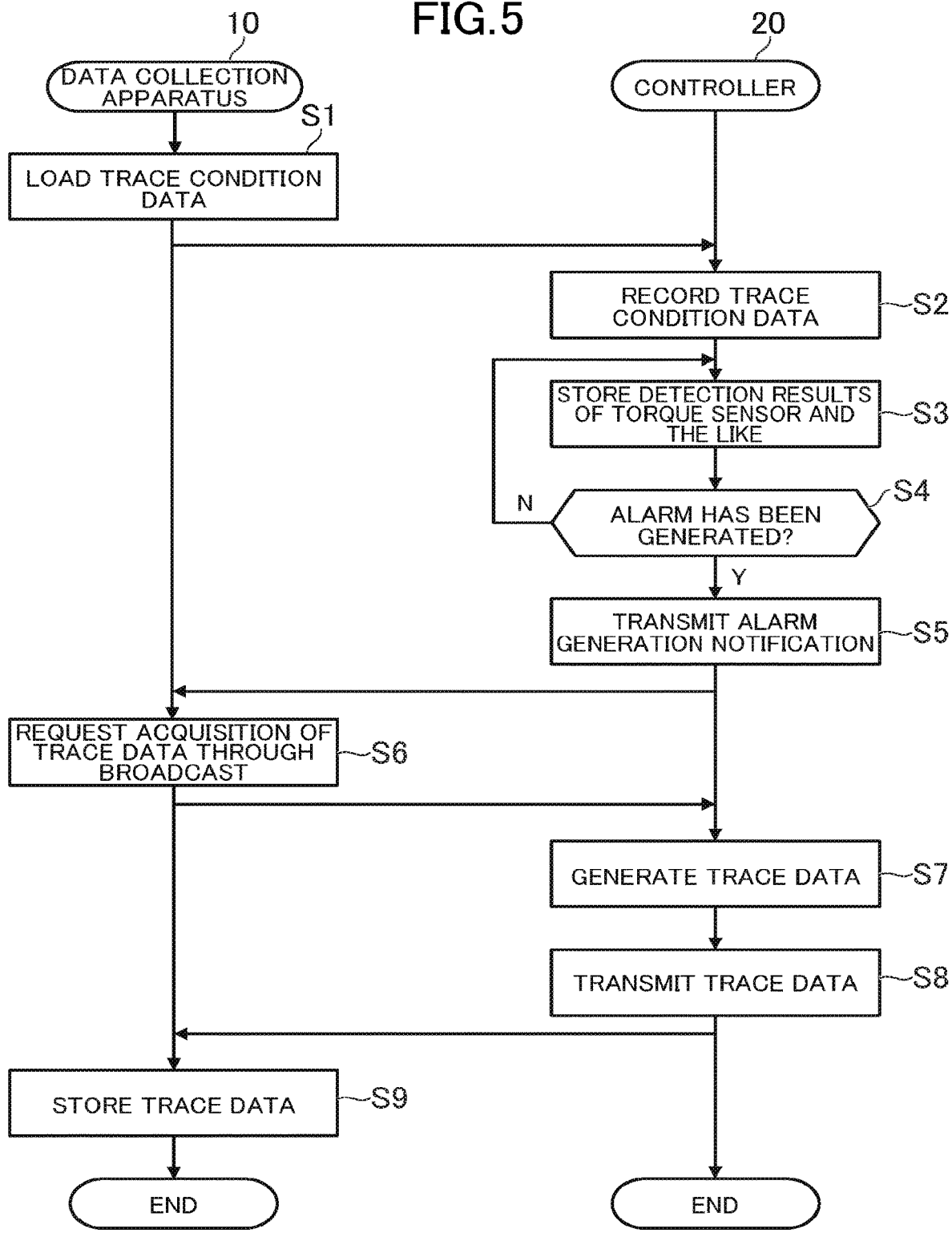
FIG. 5 is a flowchart for illustrating processing to be executed in the trace data acquisition system.

FIG. 5 is a flowchart for illustrating the processing to be executed in the trace data acquisition system 1. The processing illustrated in FIG. 5 is executed by the CPUs 11 and 21 operating in accordance with programs stored in the storages 12 and 22, respectively. The processing described below is an example of processing to be executed by the functional blocks illustrated in FIG. 2. In this embodiment, the processing itself of generating and transmitting the trace data DT2 is common to all of the controllers 20, and thus only one of the controllers 20 is illustrated in FIG. 5 for the sake of simplicity.

As illustrated in FIG. 5, when a power supply for the controllers 20 and the like is turned on, the CPU 11 loads the trace condition data DT1 to each of the plurality of controllers 20 based on the trace condition database DB1 in the data collection apparatus 10 (Step S1). In Step S1, the CPU 11 refers to the IP addresses of the controllers 20 stored in the storage 12, to thereby identify the controllers 20 connected under the data collection apparatus 10. Then, the CPU 11 transmits the trace condition data DT1 stored in the trace condition database DB1 to the identified controllers 20.

When the trace condition data DT1 is received in each of the controllers 20, the CPU 21 records the received trace condition data DT1 in the storage 22 (Step S2). The axis, the type of information, and the like to be traced are set by processing in Step S2. Subsequently, the controller 20 transmits a command to the motor control apparatus 30, and the motor control apparatus 30 controls the motor in accordance with the command. The motor control apparatus 30 transmits the detection results of the torque sensor, the motor encoder, the temperature sensor, and the like to the controller 20.

The CPU 21 acquires the detection result such as that of the torque sensor from the motor control apparatus 30, and stores the detection result in the ring buffer of the storage 22 (Step S3). The detection result in the most recent certain period is stored in the ring buffer. Thus, in Step S3, the CPU 21 stores the detection result acquired from the motor control apparatus 30 in the ring buffer, and deletes the least recent detection result.

The CPU 21 determines whether or not the alarm has been generated based on the detection results of the torque sensor and the like acquired from the motor control apparatus 30 (Step S4). For example, the generation condition is defined for each of the alarm codes in the storage 22, and the CPU 21 determines whether or not the generation condition of each of the alarm codes is satisfied in Step S4.

When it is not determined that an alarm has been generated (N in Step S4), the processing returns to Step S3, and the detection results of the torque sensor and the like are stored in the ring buffer. Meanwhile, when it is determined that an alarm has been generated (Y in Step S4), the CPU 21 transmits the alarm generation notification to the data collection apparatus 10 (Step S5). In Step S5, the CPU 21 transmits the alarm generation notification containing the own controller ID, the date and time of the generation of the alarm (namely, the current date and time), and the alarm code of the generated alarm.

When the CPU 11 receives the alarm generation notification in the data collection apparatus 10, the CPU 11 requests all of the controllers 20 to acquire the trace data DT2 through the broadcast (Step S6). In Step S6, the CPU 11 transmits a packet including an identifier requesting the acquisition of the trace data DT2 to the broadcast address of the network to which the controller 20, which has transmitted the alarm generation notification, is connected. As a result, the information on the generation of the alarm is shared among all of the controllers 20, and each of the controllers 20 stops the operation.

When the request for the acquisition of the trace data DT2 is received in each of the controllers 20, the CPU 21 generates the trace data DT2 (Step S7), and transmits the trace data DT2 generated in Step S7 to the data collection apparatus 10 (Step S8). In Step S7, the CPU 21 captures a current state of the ring buffer of the storage 22, and acquires the state as the trace data DT2. In Step S8, the CPU 21 transmits the acquired trace data DT2 as a response to the request for the acquisition of the trace data DT2.

When the CPU 11 receives the trace data DT2 from each of the controllers 20 in the data collection apparatus 10, the CPU 11 stores the received trace data DT2 in association with the alarm information in the alarm history database DB2 (Step S9), and this processing is finished. In Step S9, the CPU 11 creates a new record in the alarm history database DB2, and stores the generation date and time and the alarm code of the alarm received in Step S6 and the controller ID of the controller that has transmitted the alarm generation notification received in Step S6. Moreover, the CPU 11 stores the trace data DT2 received from all of the controllers 20 in this record. When the operation of the controller 20 is resumed by the worker or the like, the processing is executed again from Step S1 or Step S3.

With the trace data acquisition system 1, when an object is sequentially processed through the control of each of the plurality of controllers 20, the data useful for analyzing the states of the controllers 20 can be acquired by requesting not only the controller 20, which has satisfied the specific condition, for example, the alarm generation, but also the other controllers (the controllers 20, which do not satisfy the specific condition) to acquire the trace data DT2. As a result, an analyzing work by an analyst such as the worker or the like can be supported, or the data can be analyzed by AI and the like, and thus accuracy of the analysis can be increased. For example, when a certain controller 20 has satisfied the specific condition, the satisfaction may be caused by a state of this controller 20, or a state of another controller 20. In this respect, the cause can be analyzed in any one of the cases by also acquiring the trace data DT2 on the other controllers 20. Moreover, for example, in the case in which the trace data DT2 is automatically acquired when the controller 20 has satisfied the specific condition, the other controllers 20 do not satisfy the specific condition, and thus the trace data DT2 cannot be automatically acquired. However, the trace data DT2 on the other controllers 20 can also be acquired reliably by causing the request module 101 to request the acquisition of the trace data DT2. Moreover, when the data collection apparatus 10 always collects the trace data DT2, memory consumption increases, but the memory consumption can be suppressed by acquiring the trace data DT2 in the case where the specific condition is satisfied.

Moreover, the trace data DT2 can collectively be managed in the data collection apparatus 10 by causing the data collection apparatus 10 to acquire the trace data DT2 on the controller 20 in which the alarm has been generated and the trace data DT2 on the other controllers 20.

Moreover, when the generation of the alarm is used as the specific condition, the data useful for analyzing the states of the controllers 20 can be acquired by acquiring the trace data DT2 not only on the controller 20 in which the alarm has been generated, but also on the other controllers 20 (the controllers 20 in which the alarm has not been generated). As a result, the analyzing work by the analyst such as the worker or the like can be supported, the data can be analyzed by AI and the like, and thus the accuracy of the analysis can be increased. For example, when an alarm has been generated in a certain controller 20, the generation may be caused by a state of this controller 20, or a state of another controller 20. In this respect, the cause of the generation of the alarm can be analyzed in any one of the cases by also acquiring the trace data DT2 on the other controllers 20. Moreover, for example, in the case in which the trace data DT2 is automatically acquired when an alarm has been generated in the controller 20, an alarm is not generated in the other controllers 20, and thus the trace data DT2 cannot be automatically acquired. However, the trace data DT2 on the other controllers 20 can also be acquired reliably by causing the request module 101 to request the acquisition of the trace data DT2. Moreover, when the data collection apparatus 10 always collects the trace data DT2, the memory consumption increases, but the memory consumption can be suppressed by acquiring the trace data DT2 at a time when an alarm has been generated.

Moreover, the analysis of the cause of the generation of the alarm can effectively be supported by recording the trace data DT2 in association with the alarm information. For example, the analyzing work by the analyst for the cause is promoted by allowing the analysist to analyze the trace data DT2 for each type of the alarm. Moreover, a highly accurate learner can be created by, for example, creating teacher data for machine learning for each type of the alarm, and thus the accuracy of the analysis by AI can be increased.

Moreover, the trace data DT2 can collectively be managed in the data collection apparatus 10 to facilitate the management of the data by causing the data collection apparatus 10 to acquire the trace data DT2 on the controller 20 in which the alarm has been generated and the trace data DT2 on the other controllers 20.

The individual controllers 20 are not required to execute processing of requesting the acquisition of the trace data DT2 by incorporating the configuration of requesting the acquisition of the trace data DT2 into the data collection apparatus 10, and thus the processing load on the controllers 20 can be reduced.

Moreover, it is possible to more quickly detect the generation of the alarm and more quickly acquire the trace data DT2 not by the data collection apparatus 10 determining the generation of the alarm in each of the controllers 20, but by distributing the processing of determining the generation of the alarm to the individual controllers 20. Trace data DT2 closer to the point at which the alarm was generated can be acquired by quickly acquiring the trace data DT2, and more useful data can thus be acquired. Moreover, when the data collection apparatus 10 exists, the processing load on the data collection apparatus 10 can also be reduced by distributing the above-mentioned configuration to the individual controllers 20.

Moreover, it is possible to comprehensively acquire the trace data DT2 and acquire the data useful for analyzing the state of the controllers 20 by acquiring the trace data DT2 not only on the controller 20 in which the alarm has been generated, but also on all of the other controllers 20. For example, when a certain controller 20 has satisfied the condition, whichever controller 20 may cause this satisfaction, the cause can be analyzed by comprehensively acquiring the trace data DT2.

Moreover, when each of the plurality of controllers 20 controls at least one motor control apparatus 30, data useful for analyzing the state of the controller 20 can be acquired by acquiring not only the trace data DT2 on each of the controllers 20, but also the trace data DT2 on the motor control apparatus 30 controlled by each of the controllers 20. For example, when an alarm is generated in a certain controller 20, the alarm may be caused by any one of the motor control apparatus 30 to be controlled. In this respect, the cause can be analyzed by acquiring the trace data DT2 on the motor control apparatus 30 to be controlled.

Moreover, trace data DT2 adapted to each of the controllers 20 can be generated by storing the trace condition data DT1 in each of the controllers 20 in advance, and generating the trace data DT2 based on the trace condition data DT1.

Moreover, each of the controllers 20 does not record the measurement results in the entire past period in the own storage 22, but record the measurement results in the most recent period through use of the ring buffer, to thereby be able to suppress the memory consumption.

Moreover, the time point information is contained in the trace data DT2, and the user can identify at which point the trace data DT2 was acquired by only referring to the trace data DT2, and thus the analysis by the user can effectively be supported.

[5. Modification Examples]

The present invention is not limited to the embodiment described above, and can be modified suitably without departing from the spirit of the present invention.

Figure 6:
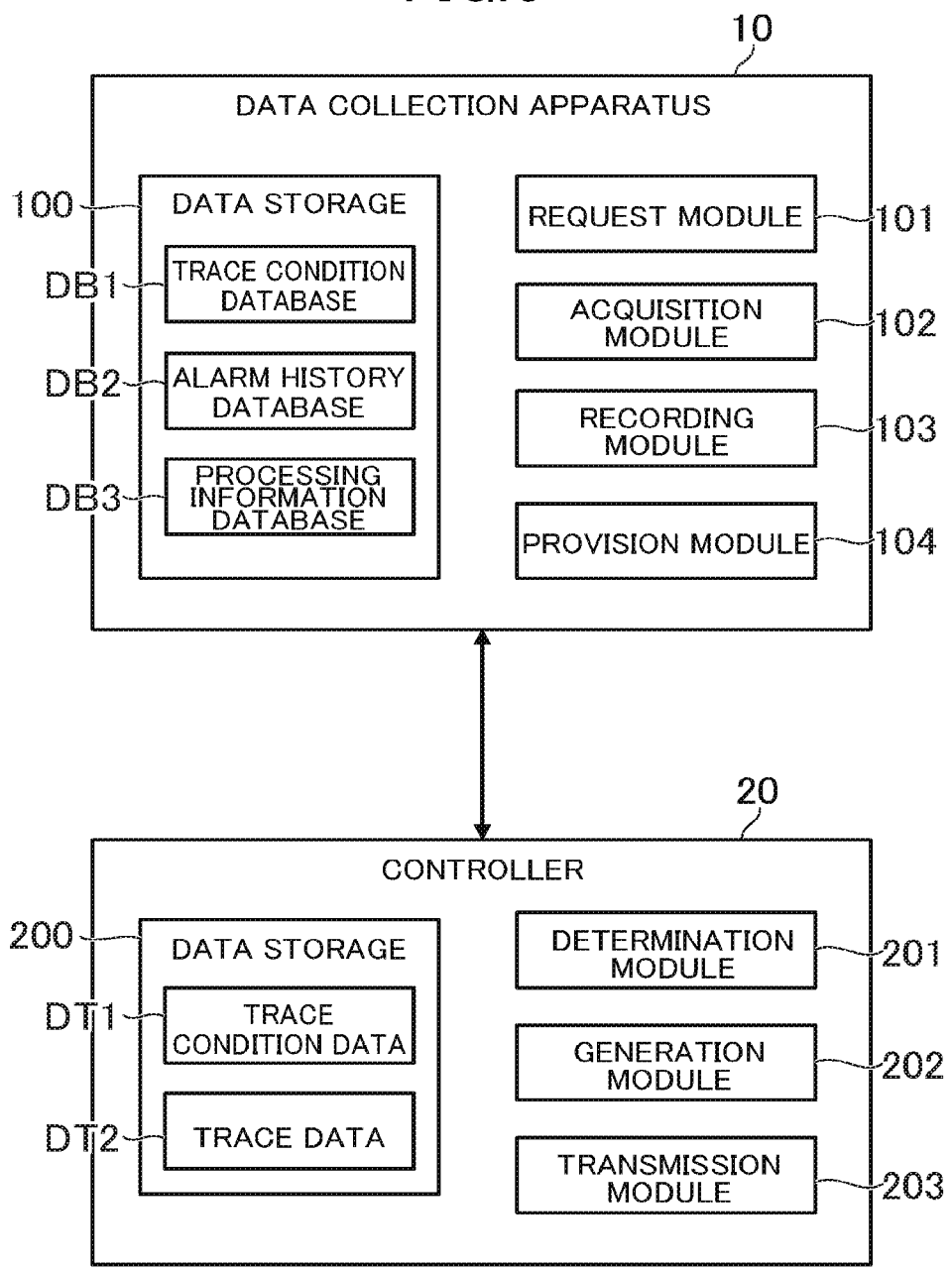
FIG. 6 is a functional block diagram of a modification example of the present invention.

FIG. 6 is a functional block diagram of the modification example. As illustrated in FIG. 6, a recording module 103 and a provision module 104 are implemented in the data collection apparatus 10 in the modification example described below. Those modules are implemented mainly by the CPU 11.

(1) For example, in the embodiment, a description is given of the case in which the trace data DT2 on all of the controllers 20 in the same network as that of the controller 20 in which the alarm has been generated is acquired. However, the controller 20 in which the alarm has been generated and the other controllers 20 in charge of processes before and after a process of the controller 20 in which the alarm has been generated are often involved with the cause of the generation of the alarm.

For example, it is assumed that an object is sequentially processed in five processes under control of five controllers 20. In this case, when an alarm is generated in the third controller 20 (the controller 20 in charge of the third process), the closest second controller or fourth controller (the controllers 20 in charge of the closest second and fourth processes) may be involved with a cause of the generation of the alarm, and the first controller or fifth controller (the controllers 20 in charge of the first and fifth processes) is less likely to be involved with the cause. Therefore, the trace data DT2 on all of the five controllers 20 is not acquired, but the trace data DT2 on only three controllers, namely, the second to fourth controllers 20 may be acquired.

The request module 101 in this modification example requests, out of the plurality of controllers 20, at least one of the controller 20 in charge of the preceding process of the controller 20 in which the alarm has been generated and the controller 20 in charge of the following process of the controller 20, which has satisfied the condition, to acquire the trace data DT2. A description is now given of the case in which the request module 101 requests both of the controller 20 in charge of the preceding process and the controller 20 in charge of the following process to acquire the trace data DT2. However, the request module 101 may request only one thereof to acquire the trace data DT2.

For example, the controller IDs of the controllers 20 in charge of the respective processes are stored in the data storage 100, and the request module 101 identifies the controllers 20 in charge of the preceding and following processes based on the controller ID contained in the alarm generation notification. The request module 101 requests the identified controllers 20 out of the controllers 20 in which the alarm has not been generated to acquire the trace data DT2, and does not request the other controllers 20 to acquire the trace data DT2.

The acquisition module 102 acquires the trace data DT2 on the controller 20 in which the alarm has been generated and at least one of the trace data DT2 on the controller 20 in charge of the preceding process and the trace data DT2 on the controller 20 in charge of the following process. As described in the embodiment, each of the controllers 20 transmits the trace data DT2 in response to the request from the request module 101. In this modification example, both of the controller 20 in charge of the preceding process and the controller 20 in charge of the following process are requested to acquire the trace data DT2, and thus the acquisition module 102 acquires the trace data DT2 from both thereof, and stores the trace data DT2 in the alarm history database DB2.

With Modification Example (1), when an alarm is generated in a certain controller 20, a cause thereof is often occurring in at least one of the preceding process and the following process. Therefore, data useful for the analysis can be acquired by acquiring the trace data DT2 on at least one thereof. Moreover, as described in the embodiment, compared with the case in which all of the trace data DT2 are comprehensively acquired, the trace data DT2 is narrowed down to the particularly important data to be acquired, and thus it is possible to reduce a processing load and a communication load on the entire trace data acquisition system 1, and also suppress memory consumption.

(2) Moreover, for example, in the trace data acquisition system 1, when processing of a certain object is finished, processing of a next object is started, and a plurality of objects are processed successively. In this case, processing information indicating a state of the processing may be recorded in association with each object so as to enable tracing after delivery or the like, to thereby increase traceability.

The data storage 100 in this modification example stores a processing information database DB3. FIG. 7 is a table for showing a data storage example of the processing information database DB3. As shown in FIG. 7, object IDs and the processing information are stored in the processing information database DB3. The object ID uniquely identifies an object. The object ID is an example of identification information on an object. The identification information may be a serial number or information referred to as individual identification information.

The processing information indicates a processing state at a time when the object was processed. The object is processed in a plurality of processes. The processing information may also be considered as information indicating each of the processes. For example, information such as a start point and a finish point of processing of an object or information on the controller 20 and the motor control apparatus 30, which have executed the processing, may be stored in the processing information. As another example, the processing information may contain information such as serial numbers of respective components and motors of the controller 20 and the motor control apparatus 30, which have executed the processing, or may indicate a waveform of the detection signal of the torque sensor and the like. As another example, when a state of the processing of the object is photographed by a camera, a still image or a motion image picked up by the camera may be contained as the processing information.

In this modification example, the recording module 103 is implemented. The recording module 103 is configured to record the processing information on the processing executed by each of the plurality of controllers 20 in association with the object ID. For example, every time processing of an object is finished, each of the controllers 20 generates processing information on the object, and transmits the processing information to the data collection apparatus 10. When the data collection apparatus 10 receives the processing information from each of the controllers 20, the data collection apparatus 10 stores the processing information in association with the object ID in the processing information database DB3. The processing information stored in the processing information database DB3 can be displayed on the display 15 of the data collection apparatus 10 or other display. For example, when the user specifies the object ID, the processing information associated with the object ID is displayed.

With Modification Example (2), a state in which an object was processed can be identified by recording the processing information on each of the controllers 20 in association with the object ID. For example, even after the object is delivered, it is possible to identify a condition in which the object was processed.

(3) Moreover, for example, the processing information recorded in the Modification Example (2) may be used in an application such as learning by a learning device configured to analyze a cause of the generation of an alarm, or may be provided as information for analyzing the cause of the generation of the alarm.

In this modification example, the provision module 104 is implemented. The provision module 104 is configured to provide processing information associated with an object ID of an object processed when an alarm was generated in the controller 20. The object processed when the alarm was generated is an object being processed when the alarm was generated. An object for which a generation point of an alarm is contained between a start point and a finish point indicated by the processing information is the object processed when the alarm was generated.

The processing information can be provided to any entity, and may be provided to a user using the data collection apparatus 10 or a user allowed to access the processing information. For example, when the user specifies an object ID, the provision module 104 refers to the processing information database DB3, to thereby acquire processing information associated with the specified object ID, and provide the processing information to the user. The provision means allowing the user to browse or access the processing information. The provision module 104 transmits the processing information to a terminal of the user. The processing information is displayed on the terminal of the user or is recorded in a memory of the terminal of the user.

With Modification Example (3), information useful for analyzing the state of the controller 20 can be provided by providing the processing information at a time when the alarm was generated in the controller 20.

(4) For example, the modification examples described above may be combined.

Moreover, for example, the description has been given of the case in which the detection result of the sensor is stored in the ring buffer of the controller 20 in the embodiment. However, the detection result may be stored not in the ring buffer, but in a storage area having a variable memory size. Moreover, for example, the description has been given of the trace data on the controller 20, but the trace data acquisition system 1 can collect any trace data on a robot controller and the like.

Moreover, for example, the data collection apparatus 10, which is the host apparatus, may not particularly exist. In such a case, the controller 20 may be configured to mainly collect the trace data DT2. For example, the request module 101 may be implemented by the controller 20. In such a case, the request module 101 of the controller 20 in which an alarm has been generated requests the acquisition of the trace data DT2 through the broadcast. As another example, IP addresses of other controllers 20 may be stored in the data storage 200 of the controller 20, and the request module 101 of the controller 20 in which an alarm has been generated requests the acquisition of the trace data DT2 based on the IP addresses of the other controllers.

Moreover, for example, the acquisition module 102 may be implemented by the controller 20. In this case, the acquisition module 102 of the controller 20 in which an alarm has been generated acquires the trace data DT2 transmitted by the other controllers 20 in response to a request of the request module 101 of the controller 20 in which the alarm has been generated. This controller 20 may store the trace data DT2 by itself, or transmit the trace data DT2 to the data collection apparatus 10 at any timing. Moreover, for example, the acquisition module 102 may be implemented by a computer (for example, a server computer) other than the data collection apparatus 10 and the controller 20, and only the request module 101 and the determination module 201 are implemented in the trace data acquisition system 1. Moreover, for example, the determination module 201 may be implemented by the data acquisition apparatus 10. In this case, it suffices that the controller 20 transmits the own operation state to the data collection apparatus 10, and the determination module 201 of the data collection apparatus 10 determines whether or not an alarm has been generated based on the operation state received from each of the controllers 20.

Further, the embodiment described above is given as a specific example, and is not to limit the invention disclosed herein to the very configuration and data storage examples of the specific example. A person skilled in the art may make various modifications to the disclosed embodiment with regard to, for example, the shapes and numbers of physical components, data structures, and execution orders of processing. It is to be understood that the technical scope of the invention disclosed herein encompasses such modifications. In other words, it should be understood by those skilled in the art that various modifications, combinations, sub-combinations and alterations may occur depending on design requirements and other factors insofar as they are within the scope of the appended claims or equivalents thereof.

The invention claimed is:

1. A trace data acquisition system, comprising:
   a first industrial machine configured to execute first processing on an object;
   a second industrial machine configured to execute second processing on the object, the second processing being different from the first processing; and
   circuitry, wherein
   the first industrial machine generates first trace data based on first condition data even when a specific condition is not satisfied,
   the second industrial machine generates second trace data based on second condition data that is different from the first condition data even when the specific condition is not satisfied, and
   the circuitry is configured to:
      determine whether the first industrial machine has satisfied the specific condition,
      determine whether the second industrial machine has satisfied the specific condition, and
      request the second industrial machine to acquire the second trace data when the first industrial machine is determined to have satisfied the specific condition and the second industrial machine is determined to not have satisfied the specific condition.

2. The trace data acquisition system according to claim 1, wherein the circuitry is configured to acquire the first trace data on the first industrial machine, which has satisfied the specific condition, and the second trace data generated by the second industrial machine.

3. The trace data acquisition system according to claim 2,
   wherein the specific condition is that an alarm is generated in the first industrial machine, and
   wherein the circuitry is configured to request the second industrial machine to acquire the second trace data when the alarm is determined to have been generated in the first industrial machine.

4. The trace data acquisition system according to claim 2, further comprising a host apparatus configured to manage the first industrial machine and the second industrial machine, wherein the first industrial machine is configured to transmit the first trace data to the host apparatus and the second industrial machine is configured to transmit the second trace data to the host apparatus.

5. The trace data acquisition system according to claim 1,
   wherein the specific condition is that an alarm is generated in the first industrial machine, and
   wherein the circuitry is configured to request the second industrial machine to acquire the second trace data when the alarm is determined to have been generated in the first industrial machine.

6. The trace data acquisition system according to claim 5, wherein the circuitry is configured to acquire the first trace data on the first industrial machine, which has satisfied the specific condition, and the second trace data generated by the second industrial machine, and record the acquired first trace data and second trace data in a storage in association with alarm information on the alarm that has been generated.

7. The trace data acquisition system according to claim 5, further comprising a host apparatus configured to manage the first industrial machine and the second industrial machine, wherein the first industrial machine is configured to transmit the first trace data to the host apparatus and the second industrial machine is configured to transmit the second trace data to the host apparatus.

8. The trace data acquisition system according to claim 1, further comprising a host apparatus configured to manage the first industrial machine and the second industrial machine, wherein the first industrial machine is configured to transmit the first trace data to the host apparatus and the second industrial machine is configured to transmit the second trace data to the host apparatus.

9. The trace data acquisition system according to claim 8, wherein the host apparatus is configured to request the first industrial machine, which has satisfied the specific condition, to acquire the first trace data, and request the second industrial machine to acquire the second trace data.

10. The trace data acquisition system according to claim 1, wherein the circuitry is configured to request all industrial machines out of a plurality of industrial machines to acquire trace data.

11. The trace data acquisition system according to claim 1, wherein the circuitry is configured to request, out of a plurality of industrial machines, at least one of an industrial machine in charge of a preceding processing of the one of the plurality of industrial machines, which has satisfied the specific condition, and an industrial machine in charge of a following processing of the one of the plurality of industrial machines, which has satisfied the specific condition, to acquire trace data.

12. The trace data acquisition system according to claim 1,
wherein each of a plurality of industrial machines is configured to control at least one machine, and
wherein the circuitry is configured to request acquisition of trace data on the machine controlled by the second industrial machine.

13. The trace data acquisition system according to claim 1, wherein each of the first industrial machine and the second industrial machine includes a storage configured to store trace condition data in advance; and
each of the first industrial machine and the second industrial machine is configured to respectively generate the first trace data and the second trace data based on the respective trace condition data.

14. The trace data acquisition system according to claim 1, wherein each of the first industrial machine and the second industrial machine is configured to:
record measurement results in a most recent period in a storage;
delete measurement results before the most recent period from the storage; and
respectively generate the first trace data and the second trace data based on the respective measurement results recorded in the storage when a request is received from the circuitry.

15. The trace data acquisition system according to claim 1, wherein the circuitry is configured to record processing information on processing executed by each of the first industrial machine and the second industrial machine in association with identification information on the object.

16. The trace data acquisition system according to claim 15, wherein the circuitry is configured to provide the processing information associated with the identification information on the object processed when the first industrial machine has satisfied the specific condition.

17. The trace data acquisition system according to claim 1, wherein the second trace data contains time point information.

18. A trace data acquisition method, comprising:
determining whether a first industrial machine has satisfied a specific condition, the first industrial machine being configured to execute first processing on an object, a second industrial machine being configured to execute second processing on the object, the second processing being different from the first processing, the first industrial machine generating first trace data based on first condition data even when the specific condition is not satisfied, and the second industrial machine generating second trace data based on second condition data that is different from the first condition data even when the specific condition is not satisfied;
determining whether the second industrial machine has satisfied the specific condition; and
requesting the second industrial machine to acquire the second trace data when the first industrial machine is determined to have satisfied the specific condition and the second industrial machine is determined to not have satisfied the specific condition.

19. A non-transitory computer readable information storage medium storing a program for causing a computer to:
determine whether a first industrial machine has satisfied a specific condition, the first industrial machine being configured to execute first processing on an object, a second industrial machine being configured to execute second processing on the object, the second processing being different from the first processing, the first industrial machine generating first trace data based on first condition data even when the specific condition is not satisfied, and the second industrial machine generating second trace data based on second condition data that is different from the first condition data even when the specific condition is not satisfied;
determine whether the second industrial machine has satisfied the specific condition; and
request the second industrial machine to acquire the second trace data when the first industrial machine is determined to have satisfied the specific condition and the second industrial machine is determined to not have satisfied the specific condition.

* * * * *